United States Patent
Park et al.

(10) Patent No.: US 11,152,625 B2
(45) Date of Patent: Oct. 19, 2021

(54) INTERMEDIATE TEMPERATURE SOLID OXIDE FUEL CELL CATHODE MATERIAL

(71) Applicant: Robert Bosch GmbH, Stuttgart (DE)

(72) Inventors: Cheol Woo Park, Evanston, IL (US); Jonathan Mailoa, Cambridge, MA (US); Soo Kim, Cambridge, MA (US); Lei Cheng, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 239 days.

(21) Appl. No.: 16/553,256

(22) Filed: Aug. 28, 2019

(65) Prior Publication Data
US 2021/0066727 A1   Mar. 4, 2021

(51) Int. Cl.
| H01M 8/04 | (2016.01) |
| H01M 4/90 | (2006.01) |
| C01G 55/00 | (2006.01) |
| C01G 39/02 | (2006.01) |
| C01G 15/00 | (2006.01) |
| H01M 8/02 | (2016.01) |
| C01G 33/00 | (2006.01) |
| H01M 8/124 | (2016.01) |

(52) U.S. Cl.
CPC .......... *H01M 4/9025* (2013.01); *C01G 15/00* (2013.01); *C01G 33/00* (2013.01); *C01G 39/02* (2013.01); *C01G 55/004* (2013.01); *H01M 8/02* (2013.01); *C01P 2002/30* (2013.01); *H01M 2008/1293* (2013.01)

(58) Field of Classification Search
CPC ..................................... H01M 8/04
See application file for complete search history.

(56) References Cited

U.S. PATENT DOCUMENTS

| 5,807,642 A | 9/1998 | Xue et al. |
| 9,656,878 B2 | 5/2017 | Yashima et al. |
| 2016/0020470 A1 | 1/2016 | Jung et al. |

OTHER PUBLICATIONS

Shin et al. ("Enhanced CO2 stability of oxyanion doped Ba2In2O5 systems co-doped with La, Zr" Journal of Power Sources vol. 196 Iss. 20, Oct. 15, 2011 pp. 8539-8543.*
Y. Hu, Y. Bouffanais, L. Almar, A. Morata, A. Tarancon, G. Dezanneau, La2-xSrxCoO4-o(x=0.9, 1.0, 1.1) Ruddlesden-Popper-type layered cobaltites as cathode materials for IT-SOFC application. International Journal of Hydrogen Energy 38 (2013) 3064-3072.

* cited by examiner

*Primary Examiner* — Jacob B Marks
(74) *Attorney, Agent, or Firm* — Brooks Kushman P.C.

(57) ABSTRACT

An intermediate temperature solid oxide fuel cell (IT-SOFC) includes an anode layer, an electrolyte adjacent to the anode layer, and a cathode layer adjacent to the electrolyte and including a material of formula (I) or (II): $Sr_2OsO_4$ (I) or $Ba_2MO_4$ (II), where M is a transition metal or post-transition metal.

20 Claims, 2 Drawing Sheets

INTERMEDIATE TEMPERATURE SOLID OXIDE FUEL CELL CATHODE MATERIAL

TECHNICAL FIELD

The present disclosure relates to intermediate temperature solid oxide fuel cell (IT-SOFC) cathode materials and an IT-SOFCs containing the cathode material.

BACKGROUND

SOFCs, like most fuel cell technologies, are at the forefront of power generation technology as they benefit the public by minimizing emissions such as $NO_x$. Compared to proton exchange membrane fuel cell (PEMFC) that may be applicable for automotive applications, SOFCs are typically intended for stationary applications. SOFCs typically feature a relatively high combined heat and power efficiency, long-term stability, fuel flexibility, and low emissions. But a common disadvantage of SOFC devices is their high operating temperature which may result in longer start-up times and mechanical and chemical compatibility issues.

SUMMARY

According to one embodiment, an IT-SOFC is disclosed. The IT-SOFC includes an anode layer, an electrolyte adjacent to the anode layer, and a cathode layer adjacent to the electrolyte and including a material having a formula (I) or (II):

$$Sr_2OsO_4 \quad \text{(I) or}$$

$$Ba_2MO_4 \quad \text{(II),}$$

where M is a transition metal or post-transition metal.

M may be molybdenum (Mo), niobium (Nb), palladium (Pd), platinum (Pt), rhodium (Rh), or scandium (Sc). The material may have formation energy of about −1.992 to −2.999 eV/atom at an intermediate temperature range of about 500 to 750° C. The material may have oxygen chemical potential minimum of about −1.220 to −5.123 eV/atom and maximum of about −0.612 to −3.524 eV/atom at an intermediate temperature range of about 500 to 750° C. The material may have thermodynamic stability of about −0.017 to −0.050 eV/atom at an intermediate temperature range of about 500 to 750° C. The material may be an oxygen deficient material having a formula (III) or (IV):

$$Sr_2OsO_{4-x} \quad \text{(III) or}$$

$$Ba_2MO_{4-x} \quad \text{(IV),}$$

where x is a number from 0 to 2.5.

The material may be an oxygen rich material having a formula (V) or (VI):

$$Sr_2OsO_{4+x} \quad \text{(V) or}$$

$$Ba_2MO_{4+x} \quad \text{(VI)}$$

where x is a number from 0 to 2.

The material may be a non-stoichiometric material having a formula (VII) or (VIII):

$$Sr_{2+a}Os_{1-b}O_4 \quad \text{(VII) or}$$

$$Ba_{2+a}M_{1-b}O_4 \quad \text{(VIII),}$$

where a is a number from 0 to 1,
where b is a number from 0 to 1,

The cathode material may be doped with one or more metal elements.

In another embodiment, an IT-SOFC cathode is disclosed. The cathode may include a material having a formula (I) or (II):

$$Sr_2OsO_4 \quad \text{(I) or}$$

$$Ba_2MO_4 \quad \text{(II),}$$

where M is a transition metal or post-transition metal.

The material may have formation energy of about −1.992 to −2.999 eV/atom at an intermediate temperature range of about 500 to 750° C. The material may have oxygen chemical potential minimum of about −1.220 to −5.123 eV/atom and maximum of about −0.612 to −3.524 eV/atom at an intermediate temperature range of about 500 to 750° C. The material may have thermodynamic stability of about −0.017 to −0.050 eV/atom at an intermediate temperature range of about 500 to 750° C. M may be molybdenum (Mo), niobium (Nb), palladium (Pd), platinum (Pt), rhodium (Rh), or scandium (Sc). The material may be an oxygen rich or oxygen deficient material.

In an alternative embodiment, an IT-SOFC material is disclosed. The material may have a formula (I) or (II):

$$Sr_2OsO_4 \quad \text{(I) or}$$

$$Ba_2MO_4 \quad \text{(II),}$$

where M is a transition metal or post-transition metal.

The material may have formation energy of about −1.992 to −2.999 eV/atom at an intermediate temperature range of about 500 to 750° C. The material may have $K_2NiF_4$-type structure. The material may have oxygen chemical potential minimum of about −1.220 to −5.123 eV/atom and maximum of about −0.612 to −3.524 eV/atom at an intermediate temperature range of about 500 to 750° C. The material may have thermodynamic stability about −0.017 to −0.050 eV/atom at an intermediate temperature range of about 500 to 750° C. M may be molybdenum (Mo), niobium (Nb), palladium (Pd), platinum (Pt), rhodium (Rh), or scandium (Sc). The material may be doped with one or more metal elements.

DETAILED DESCRIPTION

Figure 1:
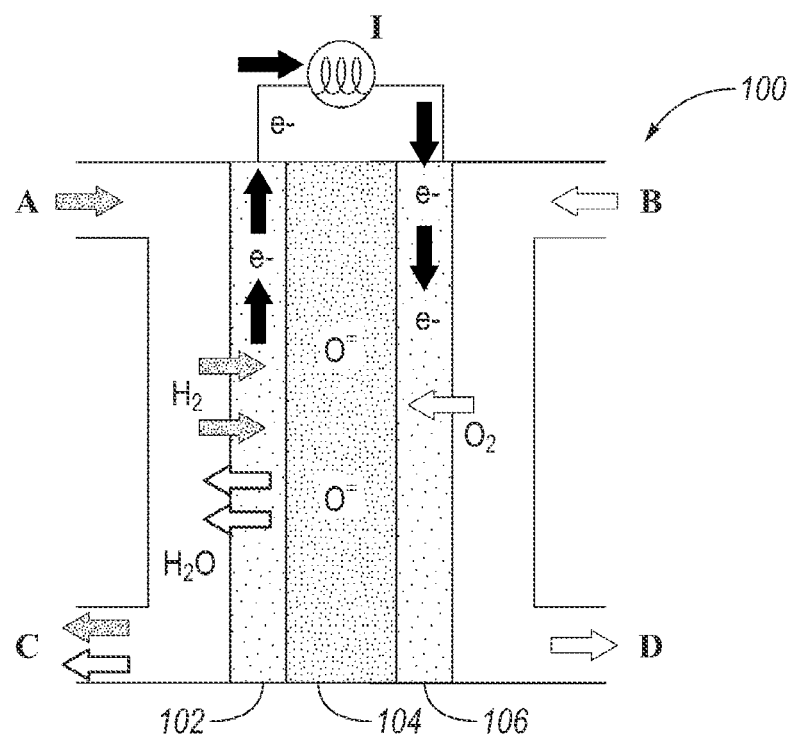
FIG. 1 is a schematic depiction of a non-limiting example of an SOFC.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±0%, 0.1%, 0.5%, 1%, 2%, 3%, 4%, 5%, or 10% of the value or relative characteristic.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells, or electrochemical cells, that convert chemical energy of a fuel (e.g. $H_2$ and also other types of hydrocarbons for SOFCs) and an oxidizing agent into electricity through a pair of electrochemical half (redox) reactions, have become an increasingly popular alternative to traditional batteries. Several different types of fuel cells have been developed to cover applications such as automotive, portable power systems, smartphones, combined heat and power, or backup power generation.

SOFCs are devices which produce electricity directly from oxidizing a fuel. Since fuel cells are characterized by their electrolyte material, the SOFC relates to solid oxide or ceramic electrolyte. A schematic depiction of a non-limiting example of a SOFC is in FIG. 1. As can be seen in FIG. 1, the cell 100 includes an anode 102, an electrolyte 104, and a cathode 106. The cell 100 is provided pure hydrogen as fuel at point A on the anode side and air at point B on the cathode side. In another embodiment, other type of hydrocarbons such as methane may be used at point A in the cell 100. At the cathode, oxygen present in the air combines with electrons to form oxygen ions, which diffuse through the electrolyte. At the anode, the ions combine with hydrogen to form water. The additional electrons released in the reaction are diverted to produce electricity. Excess fuel and water leave the cell at point C on the anode side and unused gasses are expelled out at point D on the cathode side. The cells such as the cell depicted in FIG. 1 are typically combined into stacks to provide a desired amount of voltage.

SOFCs have a number of advantages over other types of fuel cells such as fuel flexibility. For example, a SOFC may reform methane or use carbon monoxide as a fuel. A SOFC may also better tolerate fuel impurities such as ammonia and chlorides. Sulfur-bearing contaminants, though, remain to be problematic. Additionally, the SOFC reaction is heat-absorbing, thus tending to cool the cell down, which may reduce the need for cooling air.

SOFCs typically feature a relatively high combined heat and power efficiency, long-term stability, fuel flexibility, low emissions, and low cost. But as was mentioned above, a typical disadvantage of SOFC devices is their high operating temperature which may result in longer star-up times and mechanical and chemical compatibility issues. Indeed, conventional high-temperature fuel cells (HT-SOFCs) operate in temperature ranges of about 1,000 to 1,200 K or about 750 to 950° C., which means that the components of the stack need to be made from durable materials capable of withstanding high temperatures and corrosive environment. The durable material usually translates into a relatively high production cost.

Therefore, there has been a rising interest in intermediate temperature solid oxide fuel cells (IT-SOFCs), which typically operate at a reduced temperature range of about 750 to 1,000 K or about 500 to 750° C. The lower operating temperatures offer several advantages such as lower operating costs and slower degradation mechanisms of fuel cell components, consequently leading to wider range of acceptable materials that may be used to manufacture the IT-SOFCs. On the other hand, lower operating temperatures may imply sluggish kinetics due to the decreased oxygen reduction reaction (ORR) rate for the cathode. This may lead to a significant drop of the overall performance of IT-SOFCs.

Thus, it would be desirable to develop a new cathode material capable of facilitating ORR at a satisfactory rate at intermediate temperatures.

One approach to improve the IF-SOFCs has been a focus on improving the cathode material such as materials with mixed ionic-electronic conductivity properties, which are often referred to as mixed ionic-electronic conductors (MIECs). For ORR to take place, a direct contact of oxygen gas, electrode, and electrolyte is required. The area of contact, known as the triple-phase boundary (TPB), is generally limited to the interfacial region of the electrolyte surface when cathodes are composed purely of electronic conducting materials. The TPB region may be potentially expanded beyond the interfacial regions to facilitate ORR by using MIEC cathodes that allow bulk ion transportation.

Certain ceramic materials capable of facilitating ion transport have been identified such as ceramic materials of the general formula of $AB_2O_4$, where A is Cu, Co, Ni, Mn, or Zn and B is Co, Mn, or Fe and $A_2BO_4$, where A is Sm, Sr, Co, Mn, or Fe, and B is Sn, Si, Ti, Fe, Ni, or Ge. The structures of these mixed-metal oxides exhibit mixed ionic and electronic conductivity, higher electronic conductivities than those obtained with simple metal oxides. Yet some of these chemical elements are becoming scarce (Sm, Sr, or Ge) and other elements may become unstable at high temperatures for having a relatively high thermal expansion coefficient (e.g., Co). Moreover, catalytic performance of these materials is greatly reduced at lower temperature, which limits their application in IT-SOFCs. Most of these materials have been shown to degrade catalytic performance during high or intermediate temperature operation. The degradation may result from Cr migration to the cathode, from stainless steel interconnects oxidation, or attributed to the material long-term stability itself or with an electrolyte material.

Thus, there is a need for a cathode material that combines good catalytic performance and long-term stability. Further, it would be desirable to provide such materials with better tolerance towards impurities in the fuel such as hydrogen sulfide.

In one or more embodiment, an IT-SOFC cathode material is disclosed. The material may have the $K_2NiF_4$-type structure. The material may be a mixed oxide material. The material may be a mixed ionic and electronic conductor. In certain embodiments, the material has good thermodynamic stability and critical oxygen chemical potential.

Thermodynamic stability of a compound may be determined by "convex hull distance." The convex hull is defined as the envelope connecting the lowest energy compounds of a phase space. The hull distance of a compound i, $\Delta H_{stab}^i$, is given by $\Delta H_{stab}^i = \Delta H_f^i - E_{hull}^i$, where $\Delta H_f^i$ is the formation energy of compound and $E_{hull}^i$ is the convex hull (excluding compound i) energy at the composition of i. A compound is considered to be stable when $\Delta H_{stab}^i \leq 0$ meV/atom. In other words, the formation energy of a stable compound must be lower or equal to the lowest energy linear combination of phases corresponding to that composition.

The compounds that are found to be unstable, but close to convex hull may be referred to as being nearly-stable ($\Delta H_{stab}^i \leq 25$ meV/atom, i.e., roughly $k_B T$ at room temperature). The formation energies of the compounds may be determined using the Crystal Graph Convolutional Neural Network (CGCNN) and compared to the convex hull energy calculated using DFT phase space data available through the Open Quantum Materials Database (OQMD).

The critical oxygen chemical potential range represents the stability of a compound that is in equilibrium with oxygen gas. Calculated oxygen chemical potential range is converted into a more readily interpretable temperature-scale using the equation $\Delta \mu_O(T-T_0) = \Delta H_O^{exp}(T-T_0) - T\Delta S_O^{exp}(T-T_0) + RT \ln(p_{O_2}/p_{tot})$. Changes in the enthalpy and entropy with respect to temperatures are represented by $\Delta H_O^{exp}(T-T_0)$ and $\Delta S_O^{exp}(T-T_0)$, respectively, and may be obtained from JANAF (Joint Army, Navy, Air Force) experimental thermochemical tables. The JANAF thermochemical tables are compilations of the thermodynamic properties of substances over a wide temperature range, with single phase tables for the crystal, liquid, and ideal gas state. The partial pressure of oxygen gas at room temperature with respect to total pressure is given by, $p_{O_2} = 0.21 p_{tot}$. The range of the critical oxygen chemical potential may translate into a temperature range that falls within the span of about 750 to 1,000 K or about 500 to 750° C., which corresponds to the operating temperatures of IT-SOFCs.

Figure 2:
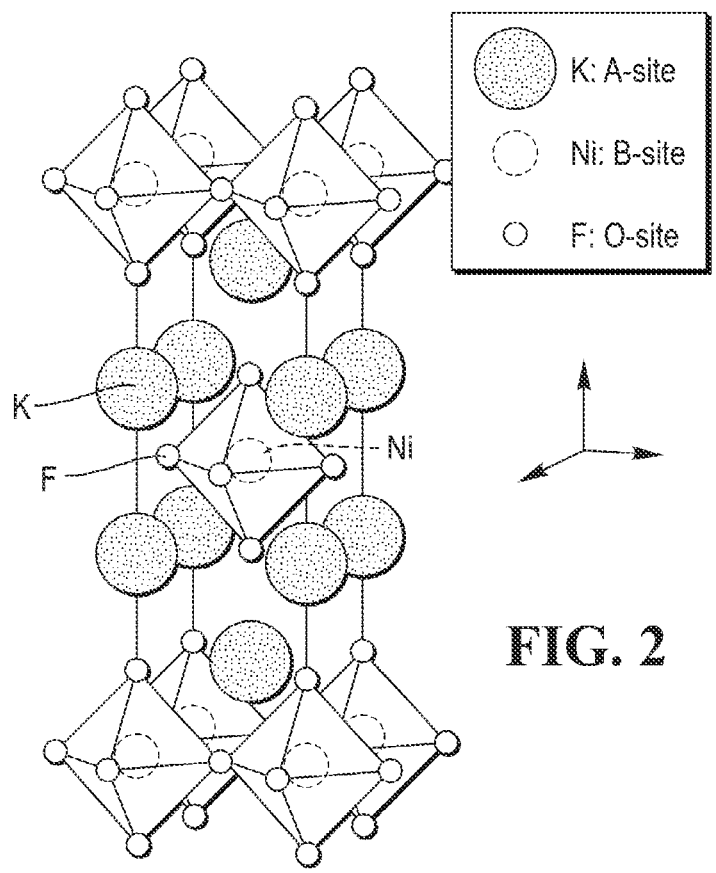
FIG. 2 shows a schematic illustration of a $K_2NiF_4$-type structure.

The material may be a Ba- or Sr-based material with $K_2NiF_4$ structure. The $K_2NiF_4$ structure is schematically shown in FIG. 2. The $K_2NiF_4$ structure is often described as a stack of perovskite $ABO_3$ layers sandwiched between rocksalt AO layers, which allows for a high concentration of oxygen interstitials that may facilitate ion transport. The material may be $K_2NiF_4$-type compound having a formula (I) or (II):

$Sr_2OsO_4$ (I) or

$Ba_2MO_4$ (II), where M is a transition metal or post-transition metal.

M in the formula (II) may be a transition metal from Groups III. B, V. B, VI. B, or VIII. B. Non-limiting examples of suitable transition metals may include molybdenum (Mo), niobium (Nb), palladium (Pd), platinum (Pt), rhodium (Rh), or scandium (Sc). M may also be a post-transition metal from Group III. A such as Ga. M may be an element from the fourth, fifth, or sixth period of the Periodic Table of Elements.

The material may be doped by cation and/or anion doping. The material may be cation-doped with metal elements, for example elements which are more economically available. A non-limiting example of the doping elements may be one or more alkaline earth metals, transition metals, post-transition metals, or metalloids. For example, the one or more elements may be from the third, fourth, fifth, or sixth period of the Periodic Table of Elements. The one or more elements may include elements from Groups II. A, III. A, IV. A, or I.B-VIII. B. Non-limiting examples of the one or more doping elements may include Al, Ca, Co, Cr, Cu, Fe, Ge, Hf, Mn, Mg, Ni, Si, Ta, Ti, V, W, Y, Zn, Zr, or W.

Alternatively or in addition, the material may be anion-doped with at least one of a non-metal element or a halogen from Groups V. A, VI. A, or VII. A such as Cl, F, N, P, or S.

The doping procedure may be done as a one-part synthesis such that the one or more doping elements are mixed with other electrode materials. Alternatively, the doping may be performed as a post-treatment, for example a surface doping. The one or more doping elements may help tune the band gap which in turn may impact the material's electronic structure and conductivity. The doping elements disclosed herein may thus be included to enhance ionic and electronic conductivity of the material.

The loading of the one or more doping elements may be about 0.01 to 5, 0.1 to 4, or 1 to 2.5 atomic %. The loading of the doping elements may be any number or range of at least about or about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 at. %.

In addition, the material may be oxygen deficient such as having a formula (III) or (IV):

$Sr_2OsO_{4-x}$ (III) or

$Ba_2MO_{4-x}$ (IV), where x is a number from 0 to 2.5,
where M is a transition metal or post-transition metal such as gallium (Ga), molybdenum (Mo), niobium (Nb), palladium (Pd), platinum (Pt), rhodium (Rh), or scandium (Sc).

Alternatively still, the material may be oxygen rich such as having a formula (V) or (VI):

$Sr_2OsO_{4+x}$ (V) or

$Ba_2MO_{4+x}$ (VI), where x is a number from 0 to 2,
M is a transition metal or post-transition metal such as gallium (Ga), molybdenum (Mo), niobium (Nb), palladium (Pd), platinum (Pt), rhodium (Rh), or scandium (Sc).

Additionally still, the material may be off-stoichiometric, having a formula (VII) or (VIII):

$Sr_{2+a}Os_{1-b}O_4$ (VII) or

$Ba_{2+a}M_{1-b}O_4$ (VIII), where a is a number from 0 to 1,
where b is a number from 0 to 1, where M is a transition metal or post-transition metal such as gallium (Ga), molybdenum (Mo), niobium (Nb), palladium (Pd), platinum (Pt), rhodium (Rh), or scandium (Sc).

The excess or deficiency of cations and anions may contribute to the change in electronic structure, change in ORR activity, increase in stability of the material, or a combination thereof. Specifically, the rate of oxygen vacancy creation from the cathode material may be controlled and adjusted. Creating the oxygen vacancy may influence the electronic structure of the material, making the structure more metallic or insulating, respectively, which may result in different activity and/or stability of the material than the material was before, rendering the material oxygen deficient or rich. The oxygen vacancy and oxygen excess thus directly impact structure of the material and its properties.

To further enhance electronic/ionic conductivity of the material, one or more conductive additives could be added to the materials. In one or more embodiments, the additives are compatible with the operating range of the IT-SOFCs.

When choosing the additive, care should be taken with respect to operating temperatures the material will be exposed to such as the temperature range of about 500 to 750° C.

The materials disclosed herein may be used as a cathode material in an IT-SOFC electrode. The loading and packing density of the material may differ based on morphology and specific gravity of individual components of the material as well as the composite made from the material.

The loading of the material may be about 0.001 to 50, 1 to 30, or 7 to 15 mg/cm$^2$. The loading of the material may be a number or a range utilizing any of the numbers recited herein such that the loading may be at least about or about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

The packing density of the material may be about 0.001 to 10 g/cc. The packing density of the material may be a number or a range utilizing any of the numbers recited herein such that the packing density may be at least about or about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, or 10.

The material may have a relatively high tolerance towards sulfur which may be beneficial for long term operation of an anode, cathode, or both of an IT-SOFC. Sulfur may be introduced into the system via fuel, for example in the form of $SO_2$ or $H_2S$.

A method of producing the material is disclosed herein. The material may be synthesized by mixing two or more precursors. A non-limiting examples of the precursors may be metal nitrides ($M(NO_3)_x$), chlorides ($MCl_x$), oxides ($MO_x$), oxalates ($M(C_2O_4)_x$), carbonates ($M(CO_3)_x$), hydroxides ($M(OH)_x$), sulfates ($M(SO_4)_x$), or a combination thereof. The synthetic routes may include solid-state synthesis (e.g., ball-milling process), solution-based method (e.g., co-precipitation), sol-gel, or hydrothermal methods and combustion or flame synthesis. The resulting mixtures may be heated in a furnace with or without the presence of oxidizing or reducing agents such as air, Ar, $CO_2$, $H_2$, $N_2$, $O_2$, other gases or their mixtures. The heating temperature may be about 100 to 2,000° C., 300 to 1,500° C., or 500 to 1,000° C. The heating process may last about 1 hour to two weeks, 2 hours to 7 days, or 3 hours to 3 days. The resulting material may be porous. The resulting material is compatible with the electrolyte.

The one or more doping elements, as discussed above, may be added to the initial mixture or added later during the heating process. The doping elements may be added via a one-part synthesis or a two-part synthesis. The method also contemplates providing doping as a post-treatment. Surface doping may be beneficial as it may be otherwise relatively difficult to diffuse the doping elements into the heated mixture.

The material may be used as a cathode material in a IT-SOFC to form a cathode layer. The IT-SOFT may be assembled including an anode, electrolyte, and cathode, as is depicted for example in FIG. 1. The anode may include a ceramic porous material to allow the fuel to flow towards the electrolyte. The anode material is an electron and/or ionic conductor. The anode may include cermet including Ni mixed with a ceramic material such as yttria stabilized zirconia (YSZ), Ni mixed with scandia stabilized zirconia (ScSZ), Ni mixed with gadolinium-doped ceria (GDC), Ni mixed with samaria-doped ceria (SDC), Cu and/or Ni mixed with $CeO_2$, $La_{1-x}Sr_xCrO_3$, $TiO_2$/YSZ, or Ru/YSZ. The anode may be the same size or form a thicker layer then the cathode layer, the electrolyte layer, or both. The anode may provide mechanical support to the cell.

The electrolyte may be a dense layer of ceramic capable of conducting oxygen ions. The electrolyte should have relatively small ionic transport resistance in the temperature range of about 500 to 750° C. The electrolyte may include yttria-stabilized zirconia (YSZ), scandia stabilized zirconia (ScSZ) (usually 9 mol % $Sc_2O_3$-9ScSZ), gadolinium doped ceria (GDC), ceria-salt ceramic composites (CSCs), or a two-phase CSC electrolyte GDC (gadolinium-doped ceria)- and SDC (samaria-doped ceria)-$MCO_3$ (M=Li, Na, K, single or mixture of carbonates). Other types of electrolyte materials may involve $LaAlO_3$-based, bismuth oxide-based, pyrochlorores-based, or barium and strontium brownmillerites.

The IT-SOFC may include one or more diffusion barrier layers preventing unwanted reactions between the anode or cathode and the electrolyte. The IT-SOFC may further include an interconnect, either made from metal or ceramic, capable of withstanding oxidizing and reducing side of the cell.

A method of identifying the disclosed material is also disclosed herein. To identify the herein-disclosed $K_2NiF_4$-type structure material suitable as a IT-SOFC cathode material, the method includes an ML-assisted high-throughput DFT survey study. The method employs the CGCNN for the ML model to predict formation energies of inorganic compounds. The method includes training the CGCNN model. The method also includes evaluating the CGCNN model on the formation energy entries taken from the OQMD, a high-throughput DFT database that contains about 550,000 DFT calculated unique compounds (i.e., experimentally found and additional structural prototypes) at the time of the data collection. Once the predictive accuracy of the CGCNN model is validated, the method may utilize the ML model to evaluate the formation energies of newly generated prototype compounds with the $K_2NiF_4$-type structure. The method uses the ML predicted formation energies to calculate the thermodynamic stability of the prototype compounds to screen out the compounds that are potentially stable. The thermodynamic stability of the ML-screened compounds are subsequently validated through DFT calculations.

The CGCNN is a ML framework that predicts material properties of inorganic materials by utilizing a graph-like representation of crystal structures, also referred to as crystal graphs. These crystal graphs are composed of two parts: (1) nodes that represent constituent atoms of the compound and (2) edges that connect neighboring atoms to represent the interatomic bonds. A node is embedded with a latent vector $v_i$ that represents the state of atom i. Each edge is also embedded with a latent vector $u_{(i,j)_k}$ that represents the interatomic distance between atoms i and j. Multiple edges can connect atoms i and j to represent the periodicity of the crystal structure and is reflected by the index k. During training, the node embeddings are iteratively updated by a given a convolution function such that the updated node vectors better reflect the local chemical environments of the represented atoms. The design of the convolution function is rather flexible and may be changed to emphasize different interatomic interactions within a crystal structure. For the CGCNN, the convolution function is given by formula (IX):

$$v_i^{(t+1)} = v_i^{(t)} + \sum_{j,k} \sigma\left(z_{(i,j)_k}^{(t)} W_1^{(t)} + b_1^{(t)}\right) \odot g\left(z_{(i,j)_k}^{(t)} W_2^{(t)} + b_2^{(t)}\right), \quad (IX)$$

where:
terms in the sum operator represent the 2-body interaction of a node with its neighboring nodes, $z_{(i,j)_k}^{(t)} = v_i^{(t)} \oplus v_j^{(t)} \oplus u_{(i,j)_k}^{(t)}$ is the concatenation of the node and edge vectors,
$\odot$ is an element-wise multiplication operator,
$\sigma$ is a sigmoid function,
g is a nonlinear activation function,
$W^{(t)}$ and $b^{(t)}$ represent the weight and bias matrices for the convolution step, respectively.

EXAMPLES

Examples 1-8

The CGCNN model described above was used to predict formation energies of inorganic compounds suitable as an IF-SOFC cathode material. The model was trained using a subset of 440,000 DFT formation energy entries randomly selected from the OQMD. Validation of the model performance was also done using the remaining subset from the DFT formation energy data.

Stability of the compounds that were found to be stable through the ML were subsequently validated through DFT. The CGCNN-predicted formation energies were compared to the convex hull energies calculated using the DFT phase space data available from the OQMD. The testing data consisted of randomly chosen 110,000 formation energy entries that were not part of the training data.

All DFT calculations were done using Vienna Ab Initio Simulation Package (VASP). Projector-augmented wave (PAW) method potentials were used with the Perdew-Burke-Ernzerhof (PBE) generalized gradient approximation for the exchange-correlation functional. DFT+U was used for compounds that contain V, Cr, Mn, Fe, Co, Ni, Cu, Th, U, Np, and Pu. Compounds that were validated to be stable by DFT were either assigned to Tier 1 or 2 depending on their critical oxygen chemical potential.

Figure 3:
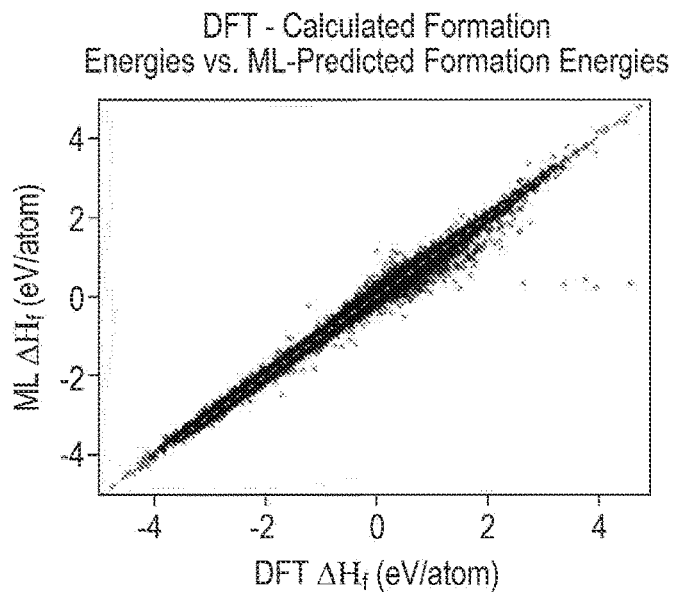
FIG. 3 shows a plot of a density functional theory (DFT)-calculated formation energies versus machine learning (ML)-predicted formation energies.

The results of the ML-predicted formation energies versus the DFT-calculated formation energies are shown in FIG. 3. The mean absolute error (MAE) of the model is 36.1 meV/atom while the root mean squared error (RMSE) is 66.0 meV/atom. In comparison, Saal, J. E., Kirklin, S., Aykol, M., Meredig, B., & Wolverton, C. (2013). *Materials design and discovery with high-throughput density functional theory: the open quantum materials database (OQMD)*. Jom, 65(11), 1501-1509 reports the difference between DFT and experimental formation energies to be around 100 meV/atom. This result shows that the CGCNN model had a very good capability to give accurate estimations for formation energies of crystalline compounds.

Once validated, the CGCNN model, trained on the OQMD formation energy data, was used to predict formation energies of newly generated prototype compounds with the $K_2NiF_4$-type structure. The new prototype compounds were generated by substituting elements in the K and Ni sites of the $K_2NiF_4$ structure. The F site of the structure was substituted with oxygen. A total of 70 metallic and rare earth elements were chosen for substitution resulting in 4,830 (70×69) variations. The following elements were chosen for the substitution: elements with atomic numbers 3-5, 11-14, 19-33, 37-52, 55-83, and 89-91.

The convex hull distance for each prototype compound was then obtained by taking the difference between the ML-predicted formation energy and convex hull energy calculated from DFT phase space data taken from the OQMD. Out of the 4,830 prototype compounds, CGCNN model predicted 61 compounds to be thermodynamically-stable.

Figure 4:
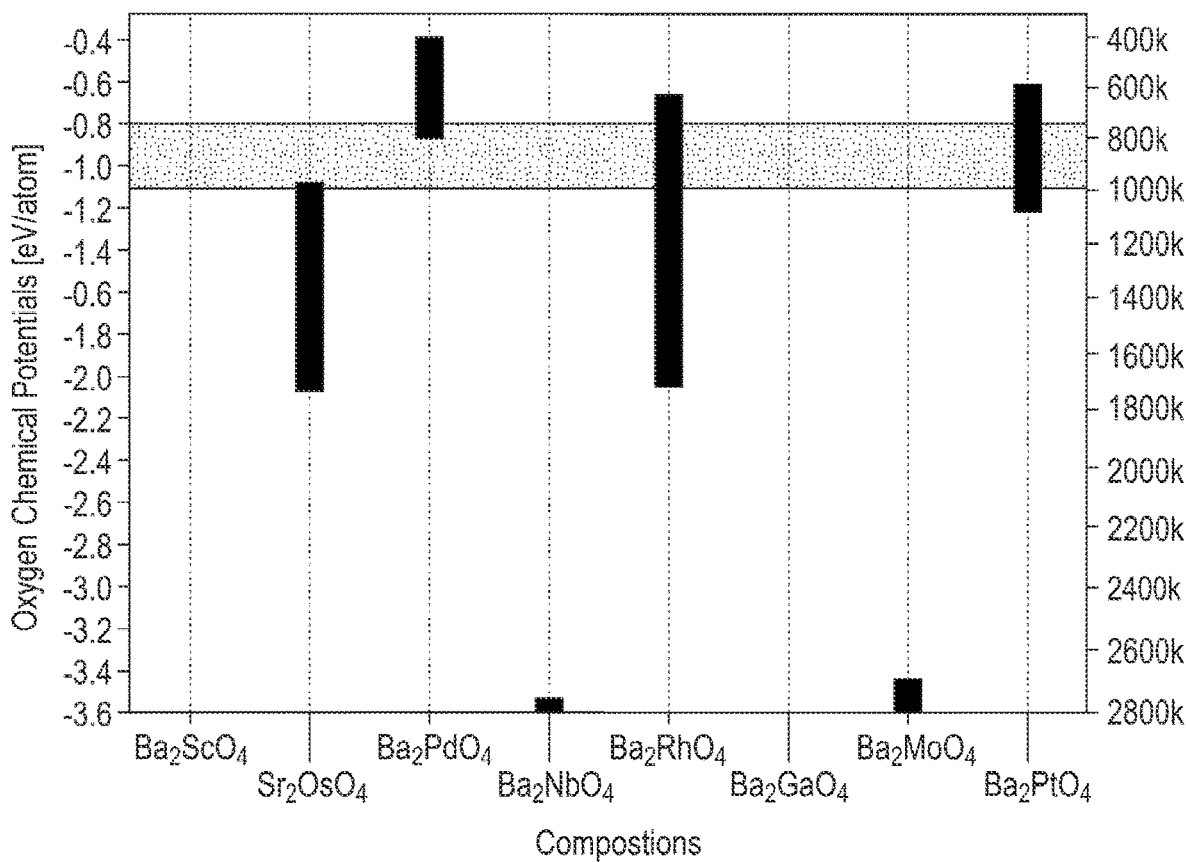
FIG. 4 shows oxygen chemical potential windows of certain disclosed material.

Compounds that contain the element Tc which is known to be radioactive were excluded. 21 remaining compounds were validated to be stable or nearly-stable via DFT method validation. Among the DFT-validated compounds discovered through the search, 8 previously-unknown compounds were identified, described as Examples 1-8. The critical oxygen chemical potential windows of these compounds are shown in FIG. 4. For each compound, the region of stability is indicated by the blue lines; compounds are not in equilibrium with oxygen gas outside this range, and may decompose to more stable phase mixtures at a given chemical system. The area in red indicates the range of stability that corresponds to the IT-SOFCs operating temperatures.

The DFT-calculated formation energies, thermodynamic stability, and critical oxygen chemical potential range of Examples 1-8 are summarized and categorized by their assigned tiers in Table 1. Each prototype compound was assigned a tier. Tiers range from 1 to 3, where a lower number indicates a higher tier. Compounds assigned to a higher tier may be more likely to be better suitable for IT-SOFC cathode. The tiers were determined by two metrics: thermodynamic stability and critical oxygen chemical potential. Tier 1 satisfies both criteria of thermodynamic stability and critical oxygen chemical potential, Tier 2 satisfied the thermodynamic stability, Tier 3 denoted nearly stable material, which could be kinetically stabilized to meet the requirements, for example by doping.

TABLE 1

DFT-calculated formation energies, thermodynamic stabilities, and oxygen chemical potential range for Examples 1-8.

| Composition | Formation Energy [eV/atom] | Thermodynamic Stability [eV/atom] | Oxygen chemical potential range [eV/atom] | |
|---|---|---|---|---|
| | | | Min | Max |
| Tier 1 | | | | |
| $Sr_2OsO_4$ | −2.277 | −0.049 | −2.080 | −1.084 |
| $Ba_2PdO_4$ | −1.958 | −0.038 | −0.869 | −0.384 |

TABLE 1-continued

DFT-calculated formation energies, thermodynamic stabilities, and oxygen chemical potential range for Examples 1-8.

| Composition | Formation Energy [eV/atom] | Thermodynamic Stability [eV/atom] | Oxygen chemical potential range [eV/atom] Min | Max |
|---|---|---|---|---|
| $Ba_2RhO_4$ | −2.122 | −0.046 | −2.055 | −0.662 |
| $Ba_2PtO_4$ | −1.992 | −0.017 | −1.220 | −0.612 |
| Tier 2 | | | | |
| $Ba_2NbO_4$ | −2.999 | −0.077 | −5.123 | −3.524 |
| $Ba_2MoO_4$ | −2.667 | −0.050 | −3.963 | −3.434 |
| Tier 3 | | | | |
| $Ba_2ScO_4$ | −2.972 | 0.016 | N/A | N/A |
| $Ba_2GaO_4$ | −2.362 | 0.004 | N/A | N/A |

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An intermediate temperature solid oxide fuel cell (IT-SOFC) comprising:
an anode layer;
an electrolyte adjacent to the anode layer; and
a cathode layer adjacent to the electrolyte and including a material having a formula (I) or (II):

$$Sr_2OsO_4 \qquad (I) \text{ or}$$

$$Ba_2MO_4 \qquad (II),$$

where M is a transition metal or post-transition metal.

2. The IT-SOFC of claim 1, wherein M is molybdenum (Mo), niobium (Nb), palladium (Pd), platinum (Pt), rhodium (Rh), or scandium (Sc).

3. The IT-SOFC of claim 1, wherein the material has formation energy of about −1.992 to −2.999 eV/atom at an intermediate temperature range of about 500 to 750° C.

4. The IT-SOFC of claim 1, wherein the material has oxygen chemical potential minimum of about −1.220 to −5.123 eV/atom and maximum of about −0.612 to −3.524 eV/atom at an intermediate temperature range of about 500 to 750° C.

5. The IT-SOFC of claim 1, wherein the material has thermodynamic stability of about −0.017 to −0.050 eV/atom at an intermediate temperature range of about 500 to 750° C.

6. The IT-SOFC of claim 1, wherein the material is an oxygen deficient material having a formula (III) or (IV):

$$Sr_2OsO_{4-x} \qquad (III) \text{ or}$$

$$Ba_2MO_{4-x} \qquad (IV),$$

where x is a number from 0 to 2.5.

7. The IT-SOFC of claim 1, wherein the material is an oxygen rich material having a formula (V) or (VI):

$$Sr_2OsO_{4+x} \qquad (V) \text{ or}$$

$$Ba_2MO_{4+x} \qquad (VI)$$

where x is a number from 0 to 2.

8. The IT-SOFC of claim 1, wherein the material is a non-stoichiometric material having a formula (VII) or (VIII):

$$Sr_{2+a}Os_{1-b}O_4 \qquad (VII) \text{ or}$$

$$Ba_{2+a}M_{1-b}O_4 \qquad (VIII),$$

where a is a number from 0 to 1,
where b is a number from 0 to 1.

9. The IT-SOFC of claim 1, wherein the cathode material is doped with one or more metal elements.

10. An IT-SOFC cathode comprising:
a material having a formula (I) or (II):

$$Sr_2OsO_4 \qquad (I) \text{ or}$$

$$Ba_2MO_4 \qquad (II),$$

where M is a transition metal or post-transition metal,
the material having formation energy of about −1.992 to −2.999 eV/atom at an intermediate temperature range of about 500 to 750° C.

11. The IT-SOFC cathode of claim 10, wherein the material has oxygen chemical potential minimum of about −1.220 to −5.123 eV/atom and maximum of about −0.612 to −3.524 eV/atom at an intermediate temperature range of about 500 to 750° C.

12. The IT-SOFC cathode of claim 10, wherein the material has thermodynamic stability of about −0.017 to −0.050 eV/atom at an intermediate temperature range of about 500 to 750° C.

13. The IT-SOFC cathode of claim 10, wherein M is molybdenum (Mo), niobium (Nb), palladium (Pd), platinum (Pt), rhodium (Rh), or scandium (Sc).

14. The IT-SOFC cathode of claim 10, wherein the material is an oxygen rich or oxygen deficient material.

15. An IT-SOFC material comprising:
a material having a formula (I) or (II):

$$Sr_2OsO_4 \qquad (I)$$ or $$Ba_2MO_4 \qquad (II),$$

where M is a transition metal or post-transition metal,
the material having formation energy of about −1.992 to −2.999 eV/atom at an intermediate temperature range of about 500 to 750° C.

16. The IT-SOFC material of claim 15, wherein the material has $K_2NiF_4$-type structure.

17. The IT-SOFC material of claim 15, wherein the material has oxygen chemical potential minimum of about −1.220 to −5.123 eV/atom and maximum of about −0.612 to −3.524 eV/atom at an intermediate temperature range of about 500 to 750° C.

18. The IT-SOFC material of claim 15, wherein the material has thermodynamic stability about −0.017 to −0.050 eV/atom at an intermediate temperature range of about 500 to 750° C.

19. The IT-SOFC material of claim 15, wherein M is molybdenum (Mo), niobium (Nb), palladium (Pd), platinum (Pt), rhodium (Rh), or scandium (Sc).

20. The IT-SOFC material of claim 15, wherein the material is doped with one or more metal elements.

\* \* \* \* \*